(12) United States Patent
Angione

(10) Patent No.: US 6,422,130 B1
(45) Date of Patent: Jul. 23, 2002

(54) PISTON AND HYDRAULIC CONTROL DEVICE FOR THE CLUTCH OF AN AUTOMOBILE PROVIDED WITH ONE SUCH PISTON

(75) Inventor: Pasquale Angione, Paris (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/762,235
(22) PCT Filed: May 31, 2000
(86) PCT No.: PCT/FR00/01519
§ 371 (c)(1),
(2), (4) Date: Feb. 5, 2001
(87) PCT Pub. No.: WO00/75525
PCT Pub. Date: Dec. 14, 2000

(30) Foreign Application Priority Data

Jun. 4, 1999  (FR) .............................. 99 07111

(51) Int. Cl.⁷ ................. F16J 1/14; F16J 9/00
(52) U.S. Cl. ............. 92/187; 92/248; 92/256
(58) Field of Search .......... 92/187, 188, 189, 92/190, 248, 255, 256, 257, 258, 259

(56) References Cited

U.S. PATENT DOCUMENTS

| | | | | |
|---|---|---|---|---|
| 268,684 A | * | 12/1882 | Jones ..................... 92/172 X |
| 2,647,683 A | * | 8/1953 | Schweller ............... 92/255 X |
| 3,187,644 A | * | 6/1965 | Ricketts ..................... 92/248 |
| 3,633,467 A | * | 1/1972 | Watanabe et al. .......... 92/172 |
| 3,741,077 A | * | 6/1973 | Hulsebus et al. ......... 92/248 X |
| 3,762,279 A | * | 10/1973 | Zeyher ................... 92/172 X |
| 3,896,707 A | * | 7/1975 | Holmstrom ............. 92/248 X |
| 3,930,437 A | * | 1/1976 | Guntert ................... 92/255 X |
| 3,984,904 A | * | 10/1976 | Schlecht ................. 92/248 X |
| 3,986,439 A | * | 10/1976 | Ring ...................... 92/248 X |
| 5,007,332 A | * | 4/1991 | Wagenseil ............... 92/255 X |
| 5,435,234 A | * | 7/1995 | Bentz et al. ................ 92/248 |
| 5,469,776 A | * | 11/1995 | Martensen et al. ....... 92/248 X |
| 6,289,790 B1 | * | 9/2001 | Rey ....................... 92/248 X |
| 6,293,185 B1 | * | 9/2001 | Stoppek et al. ............. 92/260 |

FOREIGN PATENT DOCUMENTS

| | | | |
|---|---|---|---|
| DE | 3713248 | | 11/1988 |
| EP | 0345451 | | 12/1989 |
| EP | 0778426 | | 6/1997 |
| JP | 0047644 | * | 4/1981 ............... 92/248 |

* cited by examiner

Primary Examiner—John E. Ryznic
(74) Attorney, Agent, or Firm—Liniak, Berenato, Kongacre & White

(57) ABSTRACT

The invention relates to a piston for a hydraulic control device for a clutch, especially the clutch of an automobile, having a tubular metal sleeve with an internal transversal wall which is integral with the tubular body of the sleeve. A hydraulic chamber is defined towards the front of the sleeve where the piston is mounted so as to slide axially.

17 Claims, 2 Drawing Sheets

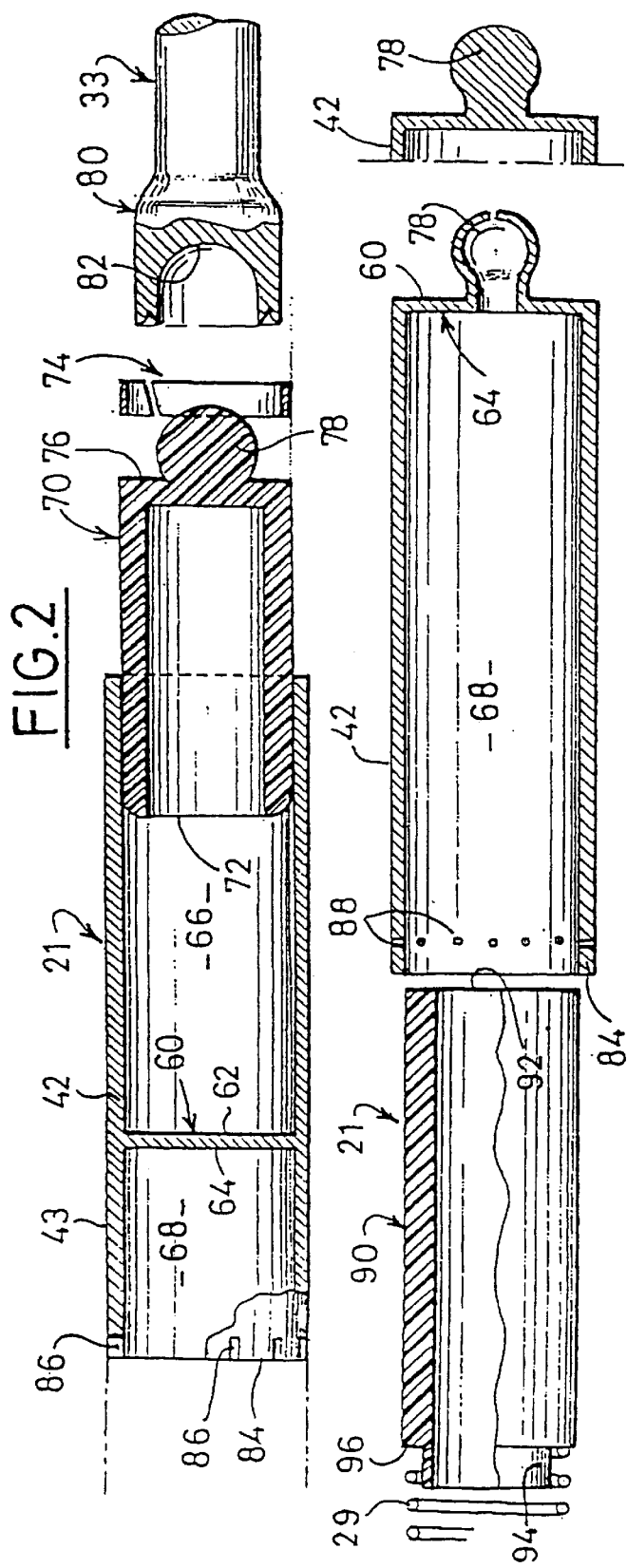
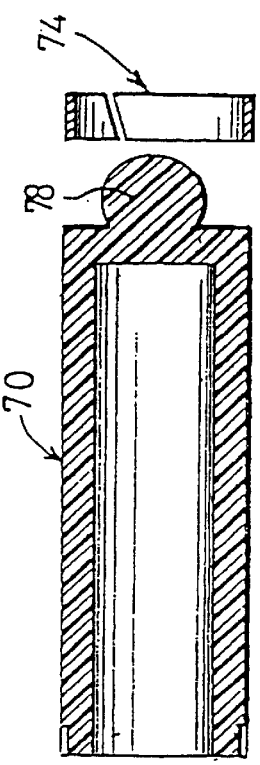
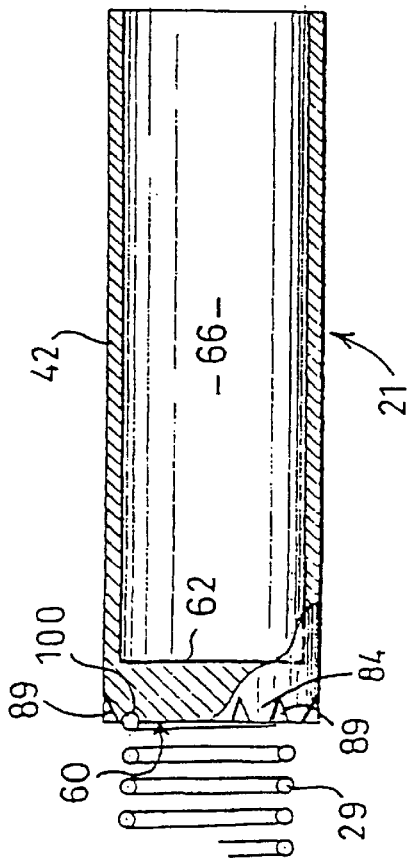

PISTON AND HYDRAULIC CONTROL DEVICE FOR THE CLUTCH OF AN AUTOMOBILE PROVIDED WITH ONE SUCH PISTON

This invention relates to a piston for a hydraulic control apparatus for a clutch, especially for a motor vehicle, comprising at least one emitter or receiver cylinder.

More particularly, the invention relates to a hydraulic control apparatus for a motor vehicle clutch comprising at least one cylinder having a cylinder body with a base portion at the front and open at the rear, a piston mounted for axial sliding movement in an internal bore of the cylinder body, at least one dynamic sealing ring carried by the cylinder body for cooperation with the outer periphery of the piston, a piston rod having at the front a head for cooperation with the piston, of the type in which the cylinder body is of plastics material, and of the type in which the piston delimits a hydraulic chamber axially at the front, and is connected at its rear end with the piston rod.

Such an apparatus is described for example in the document DE-U-295.16.488, or in French patent application No. 98 07213 of Jun. 9, 1998.

In a design which is known for example from French patent application FR 99 02426, the piston of the hydraulic control apparatus is of the type comprising a metallic tubular jacket, especially of aluminium, sheet metal or steel, which is open axially on either side and within which there is mounted, as sealingly as possible, a piston body, especially one of plastics material, in such a way that the assembly consisting of the tubular metal jacket and piston body constitutes a moving part which is movable axially in both directions in the bore of the cylinder body.

The invention aims to propose an improved design for such a piston, which, in particular, enables it to be made as cheaply as possible while improving the axial sealing of the hydraulic chamber, the rear end of which is delimited axially by the piston.

With this in view, the invention proposes a piston of the type mentioned above, characterised in that the jacket includes an internal cross wall which lies in a radial plane and which is formed integrally in one piece with the tubular body of the jacket so as to delimit axially at the front a hydraulic chamber in a cylinder body, in which the piston is mounted for axial sliding movement.

According to other features of the invention:

the jacket is formed by impact drawing;

the cross wall delimits, axially at the front, a rear cavity of the jacket which is open axially towards the rear and which receives the attached piston body;

the piston body is a member made by moulding, especially in plastics material;

the piston body is a member of generally cylindrical form complementary to that of the rear cavity of the jacket into which it is introduced axially forward from the rear, and in which it is immobilised axially in abutment against the facing rear face of the intermediate cross wall;

the piston body is immobilised by a retaining washer mounted in the rear cavity;

the free rear end of the piston body includes means for connecting the piston to the front end of a piston rod;

the free rear end of the piston body is configured as a concave or convex sphere for mounting and articulation on the front end of the piston rod;

the axial thickness of the cross wall is substantially equal to the radial thickness of the jacket;

the axial thickness of the cress wall is substantially greater than the radial thickness of the jacket, and the cross wall is arranged at the front end of the jacket;

the axial passages are formed in the peripheral surface of the jacket in line with the thick cross wall;

the cross wall delimits, axially towards the rear, a front cavity of the jacket which is open axially forward;

the front cavity receives an axial insert, of which a front transverse end face constitutes an engagement surface for the rear axial end of a piston spring;

the front cavity receives the axial rear end of a piston spring in direct axial engagement;

the cross wall is arranged at the longitudinal rear end of the jacket, and it includes, on its rear face, means formed integrally with the cross wall and the jacket, for attaching the piston to the front end of a piston rod;

the said means comprise a sphere for mounting and articulation on the front end of the piston rod.

The invention also proposes the hydraulic control apparatus for a clutch, especially a motor vehicle, characterised in that it includes a piston made in accordance with the features of the invention.

Further features and advantages of the invention will appear on a reading of the following detailed description, for an understanding of which, reference will be made to the attached drawings, in which:

FIG. 2 is an exploded perspective view of the components of the piston of FIG. 1, in association with the free front end of the piston rod;

FIG. 3 is a view similar to that in FIG. 2, showing a second embodiment of a piston according to the features of the invention;

FIG. 4 shows a modified embodiment of the mounting ball of the piston rod formed with the rear cross wall of the jacket of the piston of FIG. 3; and FIG. 5 is a view similar to those in FIGS. 2 and 3, but shows a third embodiment of a piston in accordance with the features of the invention.

Figure 1:
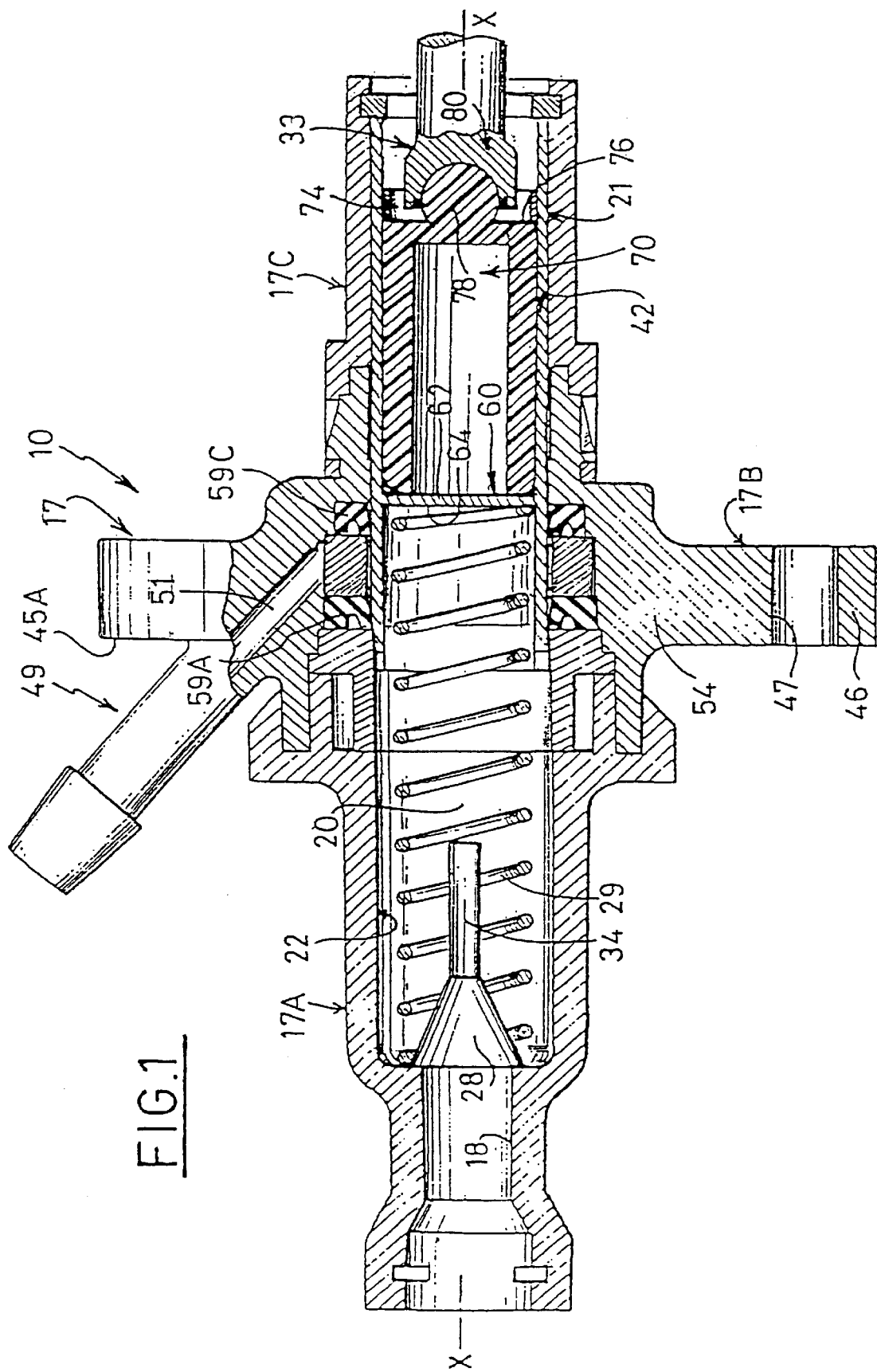
FIG. 1 is a view in longitudinal axial cross section of a clutch emitter cylinder having a piston in a first embodiment of the invention, the piston being shown in a retracted position.

In the following description, those elements which are identical, similar or analogous to each other will be designated by the same reference signs.

FIG. 1 shows a control cylinder in the form of an emitter in an apparatus for controlling a motor vehicle clutch.

Such an apparatus (not shown) includes an emitter cylinder connected through a duct to a receiver cylinder, the structure of which is similar to the emitter cylinder.

Each of the cylinders, namely the receiver and the emitter, includes a piston which is movable axially within a cylinder body, so as to define a variable volume hydraulic chamber. A connecting orifice, on which the duct is connected, is open into the hydraulic chamber.

The emitter cylinder includes a piston rod which is connected for example to a clutch pedal on which the driver acts, or to an actuator which is activated in accordance with predetermined programmes.

The piston of the emitter cylinder is adapted to expel a fluid such as oil, which is contained in the hydraulic chamber, towards the pipe or duct that connects the emitter cylinder to the receiver cylinder.

When the clutch is engaged, the volume of the hydraulic chamber of the emitter cylinder is at a maximum, while the volume of the control chamber of the receiver cylinder is at a minimum.

During the declutching operation, the volume of the hydraulic chamber of the emitter cylinder diminishes, while the volume of the control chamber of the receiver cylinder increases.

The piston of the receiver cylinder therefore acts on a rod which acts for example on the declutching fork which actuates the clutch release bearing which is part of the friction clutch.

The piston of the receiver cylinder then acts on a rod which acts directly on the release bearing in the case where the said release bearing is of the hydraulic type.

Each of the emitter and receiver cylinders includes a spring which acts between the piston and the base of the cylinder body.

This spring may be omitted in the hydraulic control where the pedal already itself includes such a spring arrangement.

When the driver releases his action on the clutch pedal, or when the actuator reverts to its initial clutch engaged position, the return spring of the emitter cylinder expands so as to put the cylinder back in its initial position, while the return spring of the emitter cylinder is compressed by the clutch spring, such as a diaphragm, which thereby puts the piston of the receiver cylinder back in its initial position.

In the drawings, the emitter cylinder 10 is shown in its as-delivered state, and it includes a cylinder body 17 having an input orifice 18 which is arranged to be covered by a cap not shown. It is through this inlet orifice that the duct or pipe (not shown) which connects the receiver cylinder (not shown) to the emitter cylinder 10 is open into the hydraulic chamber 20 of the emitter cylinder.

The chamber 20 is of variable volume, and it is bounded by the body 17 and axially towards the rear by the piston 21 which is mounted for axial movement within the cylinder body 17.

The cylinder body 17 is generally tubular in form, and in this example it consists of three distinct parts, which are formed separately by moulding in plastics material and which are disposed in axial succession from front to rear, that is to say from left to right in the drawings, consisting of a front part 17A which includes the orifice 1 8 at its front axial end, a central or intermediate part 17B, and a rear part 17C.

The cylinder body 17, in its three parts 17A, 17B and 17C has an internal bore 22 of generally blind form defining an axis X—X corresponding to the general axis of symmetry of the cylinder body 17, with, at the front, a transversely orientated base portion 24 into which the inlet orifice 18 is open, the orifice being formed in a connector 24 which enables the above mentioned duct to be connected, for example by clipping, the connector 25 having for this purpose internal passages 26 for receiving a clip by which the duct is attached to the emitter cylinder. In another version, the connector may be of the screw type.

The cylinder body 17 is generally open at the rear, that is to say its rear part 17C is itself open at the rear.

Each of the two endmost axial parts, that is to say the front part 17A and rear part 17C, is in the general form of a tubular member of generally simple design which is easy to make by moulding in plastics material.

The internal bore 22 includes a front portion 22A of constant diameter formed in the front part 17A, a stepped central portion formed in the central part 17B, and a rear portion 22C of constant diameter formed in the rear part 17C.

The piston 21 is arranged to slide in the cylinder body 17, and more precisely in the internal bore 22 of the latter, forward from the rear, starting from the retracted or clutch disengaged position shown in FIG. 1, and towards a deployed or clutch engaged position (not shown).

A projecting element 28 of generally frusto-conical form is formed integrally with the transverse base portion 24 and extends axially towards the rear in the bore 22 so as to constitute a centring element for a return spring 29, which in this example is a helical spring interposed between the cylinder body 17 and the piston 21, and more precisely between the transverse base portion 24 and the piston 21.

The projecting element 28 is extended axially towards the rear by a central cylindrical abutment chimney 34.

The orifice 18 does of course extend through the base portion 24 and is open to the side of the projecting element 28, being formed integrally by moulding with the base portion 24.

The spring 29 therefore acts axially between the base portion 24 and the front transverse face of the piston 21.

The cylinder body is arranged to be fastened on a fixed part of the vehicle, and is therefore part of the generally fixed part of the emitter cylinder 10, while the piston 21, with its piston rod 33, is comprised in the moving part of the emitter cylinder.

To this end, the central part 17B of the cylinder body 17 is made in the form of an intermediate plate which is disposed axially between the front part 17A and rear part 17C of the body 17.

The plate 17B lies transversely in a radially oriented plane at right angles to the axis X—X.

The central part 17B, constituting the fastening plate, is moulded in plastics material, and it may for example include fastening ears 46 having holes 47 through which fastening members, typically screws, for fastening the cylinder body 17 and therefore the emitter cylinder 10 on a fixed part of the motor vehicle, are passed.

FIG. 1 also shows a tube 49 fixed to the central part 17B of the cylinder body 17.

The tube 49 connects the interior of the cylinder body 17 to a main feed reservoir (not shown) which is mounted outside the cylinder body 10, the hydraulic chambers of the emitter and receiver cylinders being filled with a hydraulic fluid, such as oil for example.

The reservoir is partly filled with the hydraulic fluid and it is connected through a duct, not shown in the drawings, to the tube 49, with the latter being open into a duct 51 in an inclined orientation with respect to the axis X—X, which extends through the central part 17B from its front transverse face 45A, being open towards the rear and axially inwardly in the stepped central bore 22B formed in the solid central portion 54, which has a generally annular cylindrical form, of the central part 17B.

Sealing of the hydraulic chamber 20 with respect to the outside is ensured in this example by two dynamic sealing rings, namely a front seal 59A and a rear seal 59C, which are carried by the central part 17B of the cylinder body 17, and each of which is in cooperation with the outer periphery of the piston jacket 42, that is to say with the outer cylindrical surface of the said piston jacket 42.

Each dynamic sealing ring, namely the front seal 59A and rear seal 59C, is, in this example, a lipped sealing cup which is mounted in a complementary seating formed in the solid central portion 54 of the central part 17B, and is open radially inwards in such a way that each dynamic seal 59A, 59C is able to cooperate through its radially inward lip with the outer cylindrical surface of the piston jacket 42. By way of modification, each dynamic seal may be a composite sealing ring.

The central part 17B thus functions, by its solid central portion 54, as a compound seal which in this example carries two dynamic sealing rings, although a single dynamic sealing ring may be provided without departing from the scope of the invention.

In accordance with the features of the invention, the piston 21 consists essentially of the tubular aluminium jacket 42 which has a cross wall 60 that lies in a radial plane at right angles to the axis X—X and has two transverse faces, namely a rear face 62 and a front face 64.

In the embodiment shown in FIGS. 1 and 2, the cross wall 60 is an intermediate wall, that is to say it is disposed axially in the tubular jacket 42, within which it axially defines at the front a rear cavity 66, which is open axially to the rear, and axially at the rear a front cavity 68 which is open axially to the front.

The cavity 68, and therefore the piston 21, is therefore blind, and the piston 21, with its compartmented jacket 42, bounds and seals the hydraulic chamber 20 axially at the rear without the need for any complementary sealing means arranged within the piston 21.

To this end, and in accordance with the features of the invention, the cross wall 60 is made integrally in one piece with the tubular body of the jacket 42.

In order to make a component 42, 60 of aluminium with a low thickness and at low production cost, the compartmented jacket 42, 60 is preferably made by the impact drawing method.

This known technique enables a compact compartmented tubular component such as the jacket 42, 60 to be made in quantity production with a high production rate and low cost, the component also having high dimensional precision and a surface condition which is satisfactory for its convex outer cylindrical surface 43, along which the lips of the dynamic sealing rings sealingly slide.

Apart from the compartmented jacket 42, the piston 21 includes a piston body 70, which is made in the form of a hollow tubular cylindrical member moulded in plastics material.

The piston body 70 is open axially at the front, and is delimited by an annular front axial terminal edge 72 which, when the piston body 70 is mounted in the compartmented jacket 42, and as can be seen in FIG. 1, is in axial abutment against the rear transverse face 62 of the cross wall 60.

In order to immobilise the piston body 70 axially within the rear cavity 66 of the compartmented jacket 42 that receives it, there is for example provided an elastic washer 74 which is arranged to be gripped radially within the cavity 66, and which is in axial abutment at the front against the annular rear transverse end face 76 of the piston body 70.

The piston body 70 is a very simple component which is inexpensive to make, because it is not necessary to provide any kind of axial or radial sealing between the piston body 70 and the tubular jacket 42.

In the embodiment shown in FIGS. 1 and 2, the free rear end of the piston body 70 may include a mounting sphere 78, which is for example moulded integrally with the piston body 70, and which, in a known way, constitutes a ball for attachment and articulation for the terminal head 80 at the front of the piston rod 33, which includes a hemispherical seating 82 complementary to the sphere 78, the connection between the head 80 and the mounting sphere 78 being for example ensured by seaming or elastic mating.

In order to permit replenishment of the hydraulic chamber 20 according to the axial position of the piston 21 with respect to the front sealing ring 59A, the front longitudinal end portion 84 includes, in this example, a set of open axial slots 86 which constitute the appropriate number of passages for putting the hydraulic chamber 20 into communication with the duct 51.

In the embodiment shown in FIG. 3, the cross wall 60 is a rear axial end wall which, by its front transverse face 64, defines a single front cavity 68 within the compartmented tubular jacket 42.

In order, without modifying the length and elastic characteristics of the spring 29, to enable the latter to bear axially against the piston, the front cavity 68 of the compartmented jacket 42 receives an insert 90 which is a member of generally tubular form moulded in plastics material, and which, when in its fitted position, is in axial rearward abutment, through its annular rear transverse end face 92, against the facing portion of the front transverse face 64 of the wall 60.

The free front end portion 94 of the insert 90 is of reduced radial thickness so as to constitute a sleeve for centring and guiding the longitudinal rear end of return springs 49 which also bear axially against the radial front shoulder 96 that delimits the portion 94 of reduced thickness.

Where the general design of the apparatus so permits, that is to say where it is possible to make the return spring 29 large enough, a control apparatus can be made without any return spring, so that it is then possible to omit the insert 90.

It should be noted that, in the case of the piston body 70 of plastics material mentioned above, the insert 90 does not call for any particular precision in its dimensions in manufacture.

In order to provide for refilling of the hydraulic chamber 20, the free front end portion 84 of the tubular body of the compartmented jacket 42 includes, in this example, a set of open radial holes 88.

In order to enable the head 80 of the rod 33 to be attached and articulated, the rear cross wall 60 of the compartmented jacket 42 includes a mounting and articulation sphere 78 which is formed integrally with the compartmented jacket 42.

In the embodiment shown in FIG. 3, the sphere 78 is formed by plastic rolling, while in the case of the version shown in FIG. 4, the mounting sphere 78 is a solid ball formed by machining.

The third embodiment shown in FIG. 5 will now be described, in which the cross wall 60 is a front end wall of the tubular jacket 42 which, by its rear transverse face 62, defines only one rear cavity 66 which receives a piston body 70, the design of which is similar to that of the piston body described with reference to FIGS. 1 and 2.

The front cross wall 60 is a thick wall, that is to say its axial thickness is substantially greater than the radial thickness of the tubular body of the jacket 42.

This design enables communication passages to be formed for refilling the hydraulic chamber 20, in the form of grooves 89 formed radially within the thickness of the free front end portion 84 of the tubular jacket 42, in line with the thick cross wall 60.

Each groove 89 is V-shaped and is open axially at the front, and which is also V-shaped within the thickness of the material, so as to have a passage cross section which reduces progressively when going axially from front to rear.

The grooves 89 are preferably formed directly during the impact drawing operation of the piston body, by means of a complementary die element which is provided in the die.

This design is intended mainly for use in the case of a hydraulic control apparatus not having the return spring 29, but if the dimensioning of the components permits, and if the provision of a return spring 29 is desired, it is possible to form in the front transverse face 64 of the thick cross wall 60 an axial circular groove 100 which receives the last turn of the helical spring 29 for guiding and centring purposes.

In all cases, the front transverse face 64 of the cross wall 60 constitutes an abutment with which the free rear end of the chimney 34 cooperates in order to determine the forward position of the piston 21.

What is claimed is:

1. A piston (21) for a hydraulic control apparatus for a clutch for a motor vehicle, comprising a piston body (70) attached in a metallic tubular jacket (42) of aluminum, wherein the jacket (42) includes an internal cross wall (60) which lies in a radial plane and which is formed integrally in one piece with the tubular body of the jacket (42) so as to delimit axially at the front a hydraulic chamber (20) in a cylinder body (17), in which the piston is mounted for axial sliding movement, and in that the cross wall (60) delimits, axially, one of a front cavity (64, 68) and a rear cavity (66) of the jacket which is open axially and which receives the attached piston body (70).

2. A piston according to claim 1, characterised in that the jacket (42, 60) is formed by impact drawing.

3. A piston according to claim 1, characterised in that the piston body (70) is a member made by moulding, especially in plastic material.

4. A piston according to claim 3, characterised in that the piston body (70) is a member of generally cylindrical form complementary to that of the rear cavity (66) of the jacket (42) into which it is introduced axially forward from the rear, and in which it is immobilised axially in abutment against the facing rear face (62) of the intermediate cross wall (60).

5. A piston according to claim 4, characterised in that the piston body (70) is immobilised by a retaining washer (74) mounted in the rear cavity (66).

6. A piston according to 5, characterised in that the free rear end of the piston body (70) includes means (78) for connecting the piston (21, 42, 70) to the front end (80) of a piston rod (33).

7. A piston according to claim 6, characterised in that the free rear end of the piston body (70) is configured as a concave or convex sphere (78) for mounting and articulation on the front end (80) of the piston rod (33).

8. A piston according to 7, characterised in that the axial thickness of the cross wall (60) is substantially equal to the radial thickness of the jacket (42).

9. A piston according to 7, characterised in that the axial thickness of the cross wall (60) is substantially greater than the radial thickness of the jacket (42), and in that the cross wall is arranged at the front end of the jacket (42).

10. A piston according to claim 9, characterised in that the axial passages (86, 88, 89) are formed in the peripheral surface of the jacket in line with the thick cross wall (60).

11. A piston according to claim 2, characterised in that the cross wall (60) delimits, axially towards the rear, a front cavity (64) of the jacket which is open axially forward.

12. A piston according to claim 11, characterised in that the front cavity (64) receives an axial insert (90), of which a front transverse end face (96) constitutes an engagement surface for the rear axial end of a piston spring (29).

13. A piston according to claim 12, characterised in that the front cavity (64) is able to receive the axial rear end of a piston spring in direct axial engagement.

14. A piston according to one of claims 11 to 13, characterised in that the cross wall (60) is arranged at the longitudinal rear end of the jacket (42), and in that it includes, on its rear face, means formed integrally with the cross wall (60) and the jacket (42), for attaching the piston (21, 42) to the front end of a piston rod (33).

15. A piston according to claim 14, characterised in that the said means comprise a sphere (78) for mounting and articulation on the front end (80) of the piston rod (33).

16. Hydraulic control apparatus (10) for a clutch, especially a motor vehicle clutch, characterised in that it includes a piston (21, 42, 60) according to claim 1.

17. A piston according to claim 1, wherein the cross wall (60) delimits, axially at the front, the rear cavity (66) of the jacket which is open axially toward the rear and which receives the attached piston body (70).

* * * * *